(12) United States Patent
Chu et al.

(10) Patent No.: US 8,643,987 B2
(45) Date of Patent: Feb. 4, 2014

(54) CURRENT LEAKAGE IN RC ESD CLAMPS

(75) Inventors: Albert M. Chu, Nashua, NH (US); Joseph A. Iadanza, Hinesburg, VT (US); Mujahid Muhammad, Essex Junction, VT (US); Daryl M. Seitzer, Essex Junction, VT (US); Rohit Shetty, Essex Junction, VT (US); Jane S. Tu, Prospect Heights, IL (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 13/464,131

(22) Filed: May 4, 2012

(65) Prior Publication Data
US 2013/0293991 A1 Nov. 7, 2013

(51) Int. Cl.
*H02H 9/00* (2006.01)
*H02H 3/20* (2006.01)
*H02H 9/04* (2006.01)
*H02H 3/22* (2006.01)

(52) U.S. Cl.
USPC ............................ 361/56; 361/91.1; 361/111

(58) Field of Classification Search
USPC .......................................... 361/56, 91.1, 111
See application file for complete search history.

(56) References Cited

U.S. PATENT DOCUMENTS

| | | | |
|---|---|---|---|
| 5,510,947 A | 4/1996 | Pellegrini et al. | |
| 5,563,757 A | 10/1996 | Corsi | |
| 6,091,593 A * | 7/2000 | Lin .............................. | 361/111 |
| 6,215,350 B1 | 4/2001 | Wyland | |
| 6,861,680 B2 | 3/2005 | Ker et al. | |
| 6,872,986 B2 | 3/2005 | Fukuda et al. | |
| 6,885,529 B2 | 4/2005 | Ker et al. | |
| 6,958,896 B2 * | 10/2005 | Lin et al. ......................... | 361/56 |
| 7,098,513 B2 | 8/2006 | Chatty et al. | |
| 7,196,887 B2 * | 3/2007 | Boselli et al. ................... | 361/56 |
| 7,203,045 B2 | 4/2007 | Chatty et al. | |
| 7,274,546 B2 * | 9/2007 | Gauthier et al. ................ | 361/56 |
| 7,359,170 B2 | 4/2008 | Behzad et al. | |
| 7,483,247 B2 | 1/2009 | Poon et al. | |
| 7,639,463 B2 | 12/2009 | Steinhoff et al. | |

(Continued)

OTHER PUBLICATIONS

Tong et al., A Novel Substrate-Triggered ESD Protection Structure for a Bus Switch IC with On-Chip Substrate Pump, IEEE International Symposium on Circuits and Systems, ISCAS 2005, May 23-26, 2005, vol. 2, pp. 1190-1193.

(Continued)

*Primary Examiner* — Rexford Barnie
*Assistant Examiner* — Christopher Clark
(74) *Attorney, Agent, or Firm* — David A. Cain; Hoffman Warnick LLC

(57) ABSTRACT

Aspects of the invention provide an electrostatic discharge (ESD) protection device for eliminating current leakage, and a related method. In one embodiment, an ESD protection device includes: a resistor-capacitor (RC) circuit for receiving a power supply voltage; an ESD clamp including a plurality of n-type field-effect transistors (nFETs) for protecting the IC during an ESD event; a trigger circuit for receiving an output of the RC circuit and generating a trigger pulse to turn on the ESD clamp during the ESD event; and an nFET bias selection circuit connected to the trigger circuit, the nFET bias selection circuit for selecting one of: a low voltage supply or a negative bias voltage supply for the trigger circuit, such that the trigger circuit generates a trigger pulse, in response to selecting the negative bias voltage supply, to turn off the ESD clamp during normal operation.

18 Claims, 3 Drawing Sheets

(56) References Cited

U.S. PATENT DOCUMENTS

| | | |
|---|---|---|
| 7,838,924 B2 | 11/2010 | Boselli et al. |
| 8,315,025 B2 | 11/2012 | Hartberger |
| 2004/0190209 A1 | 9/2004 | Jozwiak et al. |
| 2004/0224452 A1 | 11/2004 | Li et al. |
| 2006/0050451 A1 | 3/2006 | Jen Chou |
| 2006/0198069 A1 | 9/2006 | Chuan et al. |
| 2007/0053120 A1 | 3/2007 | Gauthier, Jr. et al. |
| 2009/0135533 A1 | 5/2009 | Ker et al. |
| 2009/0268359 A1 | 10/2009 | Chatty et al. |
| 2010/0328826 A1 | 12/2010 | Salman et al. |
| 2011/0063765 A1 | 3/2011 | Boselli et al. |
| 2012/0236444 A1* | 9/2012 | Srivastava et al. .............. 361/56 |
| 2012/0300349 A1* | 11/2012 | Abou-Khalil et al. .......... 361/56 |

OTHER PUBLICATIONS

Cao et al, ESD Design Challenges and Strategies in Deeply-scaled Integrated Circuits, IEEE Custom Integrated Circuits Conference, CICC '09, Sep. 13-16 2009, pp. 681-688.

Ker et al., ESD-Protection Design with Extra Low-Leakage-Current Diode String for RF Circuits in SiGe BiCMOS Process, IEEE Transactions on Device and Materials Reliability, vol. 6, No. 4, Dec. 2006, pp. 517-527.

Hoang, U.S. Appl. No. 13/398,038, Office Action 1, Apr. 1, 2013, 15 pages.

Hoang, U.S. Appl. No. 13/398,038, Notice of Allowance & Fees Due, Jun. 25, 2013, 9 pages.

* cited by examiner

CURRENT LEAKAGE IN RC ESD CLAMPS

FIELD OF THE INVENTION

The disclosure relates generally to integrated circuit (IC) devices, and more particularly, to an electrostatic discharge (ESD) protection device or clamp for reducing current leakage, and a related method.

BACKGROUND

Electrostatic discharge (ESD) is the transfer of electrostatic charge between bodies at different electrostatic potentials (voltages), and can destroy and seriously impair IC devices. ESD protection devices are often built into IC devices, in order to protect the various electronic components with the IC device.

Standards for ESD protection devices are created by a standardization organization, such as the Joint Electron Devices Engineering Council (JEDEC). Some of these standards include the human-body model (HBM), the machine model (MM), and the charge-device model (CDM). Each model characterizes the susceptibility of an electronic device (e.g., an IC) to damage from ESD.

The HBM simulates the ESD which may occur from the charge that accumulates in a human body discharging through the electronic device. The MM simulates the ESD which may occur from the charge that accumulates in a manufacturing machine (for packaging and probing) discharging through the electronic device. The goal of the CDM is to simulate the discharge from the device through mechanical means when contact is made to a low impedance ground or a charge sink. For example, this may occur when the electronic device slides down a feeder tube during board assembly.

BRIEF SUMMARY

Aspects of the invention provide an ESD protection device for eliminating current leakage, and a related method. In one embodiment, an ESD protection device for an IC is provided. The ESD protection device includes: a resistor-capacitor (RC) circuit for receiving a power supply voltage; an ESD clamp including a plurality of n-type field-effect transistors (nFETs) for protecting the IC during an ESD event; a trigger circuit for receiving an output of the RC circuit and generating a trigger pulse to turn on the ESD clamp during the ESD event; and an nFET bias selection circuit connected to the trigger circuit, the nFET bias selection circuit for selecting one of: a low voltage supply or a negative bias voltage supply for the trigger circuit, such that the trigger circuit generates a trigger pulse, in response to selecting the negative bias voltage supply, to turn off the ESD clamp during normal operation.

A first aspect of the disclosure provides an electrostatic discharge (ESD) protection device for an integrated circuit (IC), comprising: a resistor-capacitor (RC) circuit for receiving a power supply voltage; an ESD clamp including a plurality of n-type field-effect transistors (nFETs) for protecting the IC during an ESD event; a trigger circuit for receiving an output of the RC circuit and generating a trigger pulse to turn on the ESD clamp during the ESD event; and an nFET bias selection circuit connected to the trigger circuit, the nFET bias selection circuit for selecting one of: a low voltage supply or a negative bias voltage supply for the trigger circuit, such that the trigger circuit generates a trigger pulse, in response to selecting the negative bias voltage supply, to turn off the ESD clamp during normal operation.

A second aspect of the disclosure provides an integrated circuit (IC), comprising: a plurality of electrostatic discharge (ESD) protection devices for the IC, each ESD protection device comprising: a resistor-capacitor (RC) circuit for receiving a power supply voltage; an ESD clamp including a plurality of n-type field-effect transistors (nFETs) for protecting the IC during an ESD event; a trigger circuit for receiving an output of the RC circuit and generating a trigger pulse to turn on the ESD clamp during the ESD event; and an nFET bias selection circuit connected to the trigger circuit, the nFET bias selection circuit for selecting one of: a low voltage supply or a negative bias voltage supply for the trigger circuit, such that the trigger circuit generates a trigger pulse, in response to selecting the negative bias voltage supply, to turn off the ESD clamp during normal operation.

A third aspect of the disclosure provides a method of eliminating current leakage in an electrostatic discharge (ESD) protection device for an integrated circuit (IC), the method comprising: providing an ESD clamp for protecting the IC during an ESD event, the ESD clamp including a plurality of n-type field-effect transistors (nFETs) and directly connected to an RC circuit and a trigger circuit of the ESD protection device; providing an nFET bias selection circuit connected to the trigger circuit, the nFET bias selection circuit for selecting a low voltage supply or a negative bias voltage supply; turning off the ESD clamp, during normal operation, in response to the nFET bias selection circuit selecting the negative bias voltage supply; and turning on the ESD clamp, during the ESD event, in response in response to the nFET bias selection circuit selecting the low voltage supply.

BRIEF DESCRIPTION OF THE DRAWINGS

The above and other aspects, features and advantages of the disclosure will be better understood by reading the following more particular description of the disclosure in conjunction with the accompanying drawings.

Figure 1:
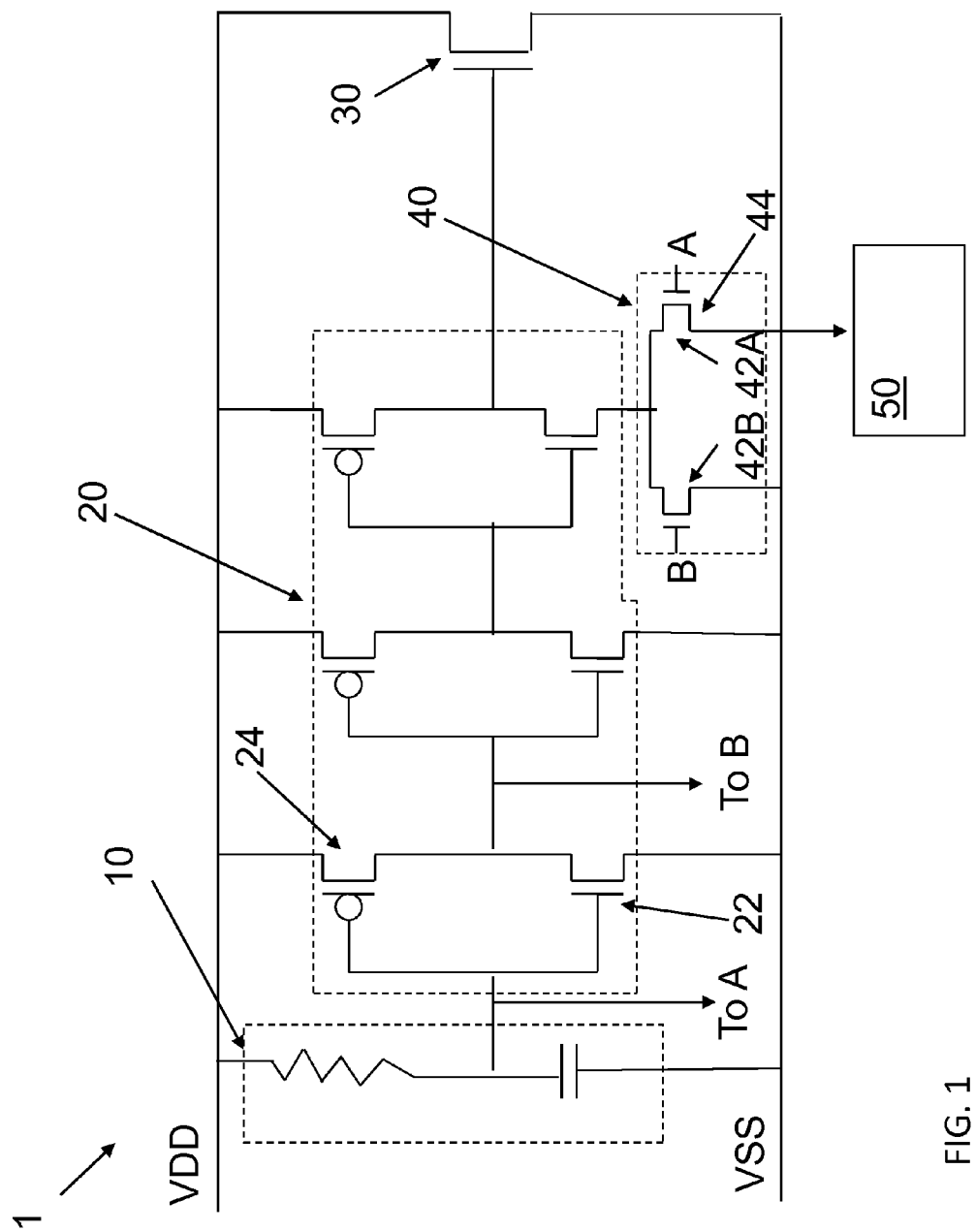
FIG. 1 shows a schematic diagram of an electrostatic discharge protection device according to embodiments of the invention.

The drawings are not necessarily to scale. The drawings are merely schematic representations, not intended to portray specific parameters of the disclosure. The drawings are intended to depict only typical embodiments of the disclosure, and therefore should not be considered as limiting the scope of the disclosure. In the drawings, like numbering represents like elements.

DETAILED DESCRIPTION

The disclosure relates generally to integrated circuit (IC) devices, and more particularly, to an electrostatic discharge protection device for eliminating current leakage, and a related method.

Electrostatic discharge (ESD) is the transfer of electrostatic charge between bodies at different electrostatic potentials (voltages), and can destroy and seriously impair IC devices. ESD protection devices are often built into IC devices, in order to protect the various electronic components with the IC device.

Standards for ESD protection devices are created by a standardization organization, such as the Joint Electron Devices Engineering Council (JEDEC). Some of these standards include the human-body model (HBM), the machine model (MM), and the charge-device model (CDM). Each model characterizes the susceptibility of an electronic device (e.g., an IC) to damage from ESD. The electronic device must be designed to comply with each of these standards.

The HBM simulates the ESD which may occur from the charge that accumulates in a human body discharging through the electronic device. The MM simulates the ESD which may occur from the charge that accumulates in a manufacturing machine (for packaging and probing) discharging through the electronic device. The goal of the CDM is to simulate the discharge from the device through mechanical means which contact is made to a low impedance ground or a charge sink. For example, this may occur when the electronic device slides down a feeder tube during board assembly.

With the decrease in channel lengths in the latest technologies (for example, the 32 nm silicon-on-insulator (SOI) technology or the 28 nm CMOS technology), high current leakage in the current ESD protection devices has been difficult to avoid. In particular, the CDM standard is harder to meet compared to the MM standard or the HBM standard due to higher current limits. To handle the higher current limits, and comply with the CDM standard, additional clamps are required for the ESD protection device. However, the additional clamps increase the size of the overall ESD protection device. Additionally, each clamp naturally exhibits a current leakage, so the addition of numerous clamps increases the overall current leakage of the ESD protection device.

Aspects of the invention provide an ESD protection device for eliminating current leakage, and a related method. In one embodiment, an ESD protection device for an IC is provided. The ESD protection device includes: a resistor-capacitor (RC) circuit for receiving a power supply voltage; an ESD clamp including a plurality of n-type field-effect transistors (nFETs) for protecting the IC during an ESD event; a trigger circuit for receiving an output of the RC circuit and generating a trigger pulse to turn on the ESD clamp during the ESD event; and an nFET bias selection circuit connected to the trigger circuit, the nFET bias selection circuit for selecting one of: a low voltage supply or a negative bias voltage supply for the trigger circuit, such that the trigger circuit generates a trigger pulse, in response to selecting the negative bias voltage supply, to turn off the ESD clamp during normal operation.

Turning to FIG. 1, a schematic diagram of an electrostatic discharge (ESD) protection device 1 according to embodiments of the invention is shown. ESD protection device 1 includes a resistor-capacitor (RC) circuit 10 that receives a power supply voltage "VDD".

An output "A" of the RC circuit 10 is sent to a trigger circuit 20. As shown in FIG. 1, the trigger circuit 20 includes a plurality of inverters. Although FIG. 1 only shows 3 inverters, it is understood that the trigger circuit 20 may include any odd number of inverters, such that the output of the trigger circuit 20 is the opposite of the output of the RC circuit 10.

The trigger circuit 20 generates a trigger pulse (not shown) for driving an ESD clamp 30. As shown in FIG. 1, the output of the trigger circuit 20 is directly connected to the ESD clamp 30. Although FIG. 1 shows the ESD clamp 30 as a single n-type field-effect transistor (FET), it is understood that this is for clarity and exemplary purposes only, and that the ESD clamp 30 may include any number of n-type FETs (nFETs).

The trigger circuit 20 includes a plurality of inverters, as known in the art. In this transistor-level schematic, shown in FIG. 1, each inverter in the trigger circuit 20 includes an nFET 22 and a p-type FET (pFET) 24. As will be described herein, the trigger circuit 20 generates a trigger pulse that will turn on the ESD clamp 30 during an ESD event.

As shown in FIG. 1, an nFET bias selection circuit 40 includes a pair of nFETs, 42A and 42B. The nFET bias selection circuit 40 is connected to the trigger circuit 20 via the drain of nFET 42A and the source of nFET 42B. The nFET bias selection circuit 40 is connected to a low voltage supply "VSS" and a negative bias voltage supply 50. That is, the drain of nFET 42B is connected to the low voltage supply "VSS" and a source 44 of nFET 42A is connected to a negative bias voltage supply 50.

Figure 2:
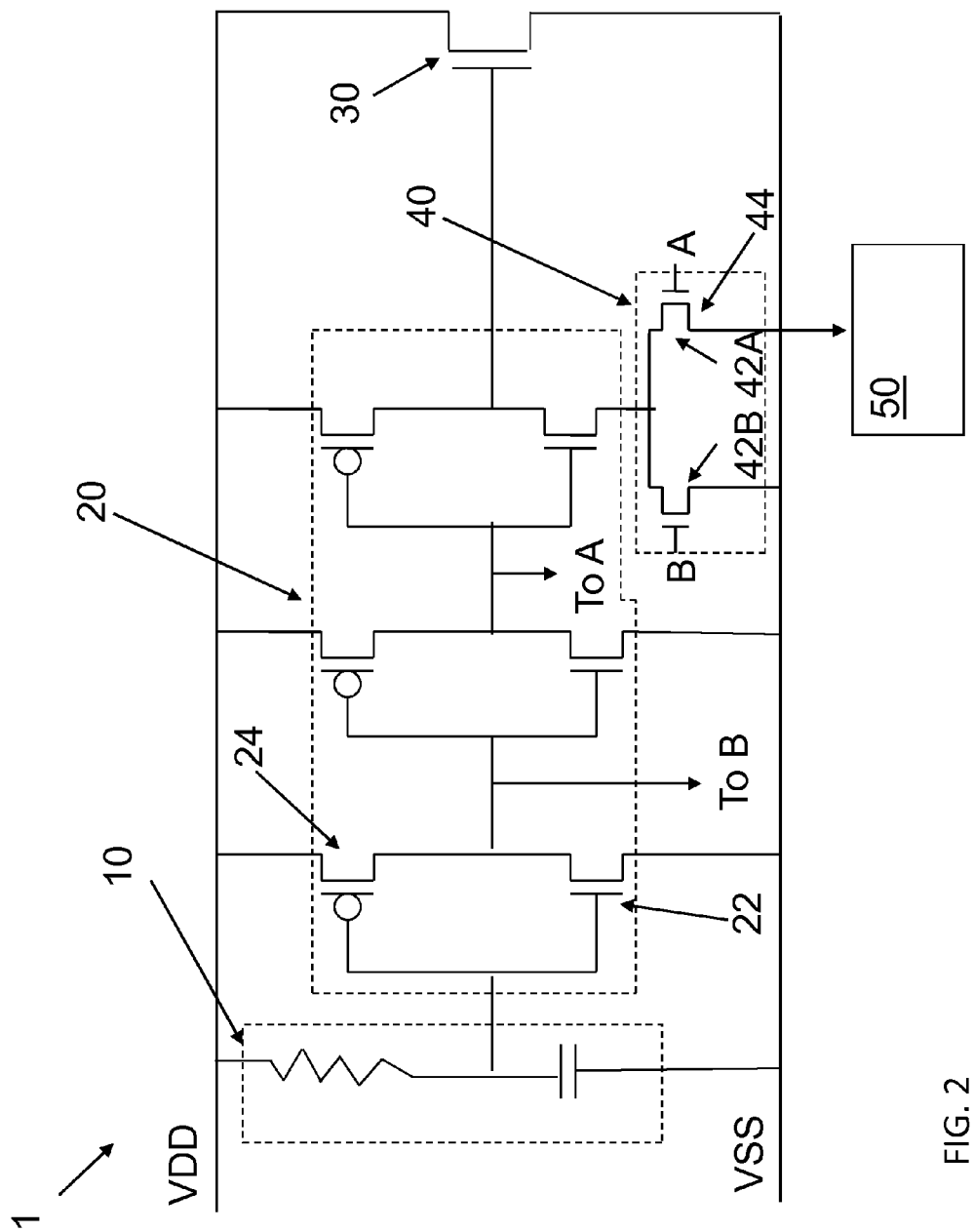
FIG. 2 shows a schematic diagram of an electrostatic discharge protection device according to embodiments of the invention.
Figure 3:
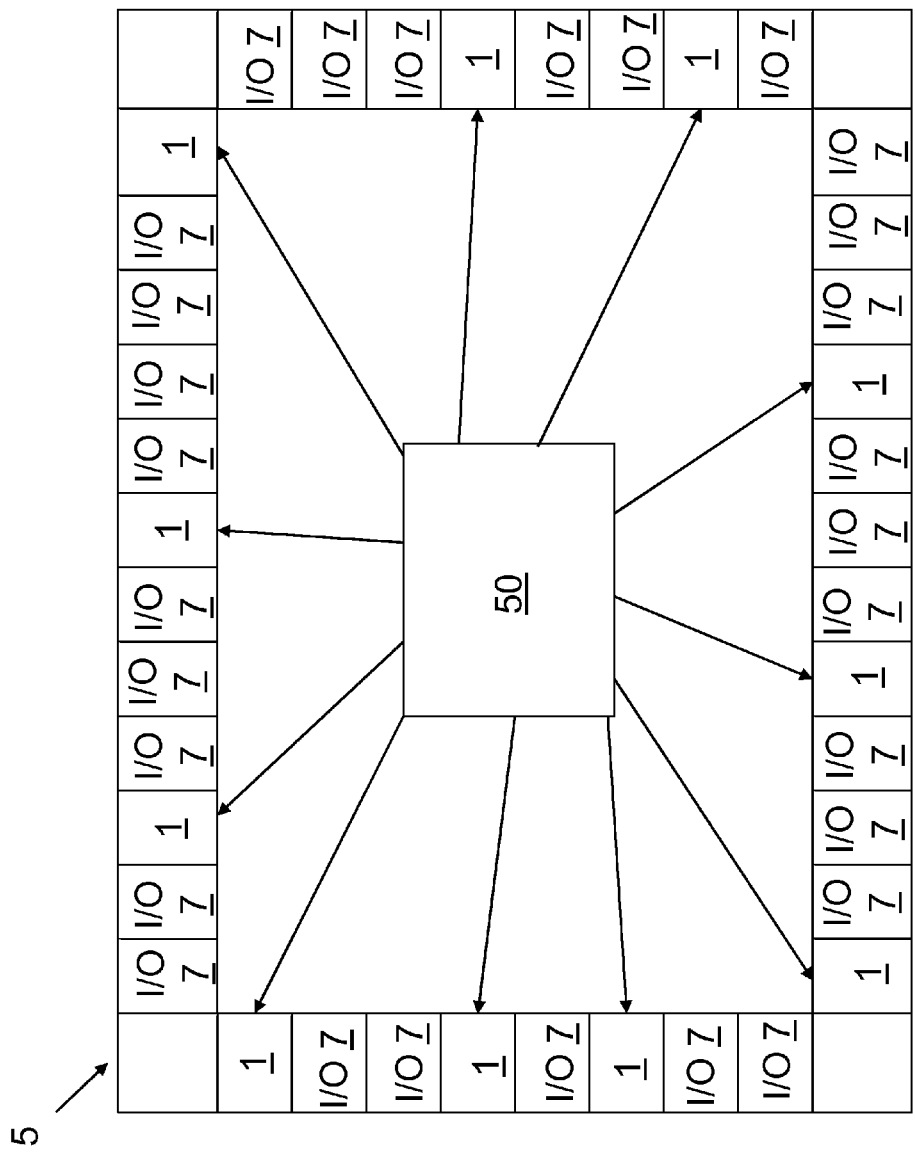
FIG. 3 shows a schematic diagram of an integrated circuit including an electrostatic discharge protection device according to embodiments of the invention.

In the embodiments shown in FIGS. 1 and 2, the negative bias voltage supply 50 may be an external power supply. However, in an alternative embodiment, as shown in FIG. 3, the negative bias voltage supply 50 may be a charge pump that is provided on an integrated circuit 5.

The gates (labeled "A" and "B") of the nFETs 42A, 42B in the nFET bias selection circuit 40 are connected to the output "A" of the RC circuit 10 and the output "B" of the first inverter in the trigger circuit 20, respectively. As will be described herein, these connections of the gates of the nFETs 42A, 42B in the nFET bias selection circuit 40 cause the trigger circuit 20 to turn off the ESD clamp 30 during normal operation (i.e., in the absence of an ESD event) and turn on the ESD clamp during an ESD event.

Under normal conditions (i.e., in the absence of an ESD event), the output "A" of the RC circuit 10 is a "1" (i.e., the power supply voltage "VDD"), and this output "A" is provided to the gate of the nFET 42A in the nFET bias selection circuit 40. This turns on nFET 42A. The output "B" of the first inverter is a "0" and is provided to the gate of the nFET 42B, which turns of nFET 42B. The nFET bias selection circuit 40, since nFET 42A is turned on and nFET 42B is turned off, selects the negative bias voltage supply 50. Therefore, under normal conditions (i.e., in the absence of an ESD event) the negative bias voltage from the negative bias voltage supply 50, which is connected to nFET 42A, is passed to the trigger circuit 20.

In the trigger circuit 20, under normal conditions, the pFET of the last inverter is off, while the nFET of the last inverter is on. The nFET in the last inverter of the trigger circuit 20 is directly connected to the nFET bias selection circuit 40, so the gate of the ESD clamp 30 will receive the negative bias voltage (selected by the nFET bias selection circuit 40). This negative bias voltage turns the ESD clamp 30 off, so that current leakage is eliminated during normal operation (e.g., in the absence of an ESD event).

Once an ESD event occurs, the output "A" of the RC circuit 10 turns to a "0," which turns on nFET 42B, and turns off nFET 42A. That is, the nFET bias selection circuit 40 selects the low voltage supply "VSS." The negative bias voltage from the supply 50, which is connected to nFET 42A, does not pass to the trigger circuit 20. Further, the nFET in the last inverter of the trigger circuit 20, which is directly connected to the nFET bias selection circuit 40, is turned off, so that any voltage (e.g., the low voltage supply "VSS") from the nFET bias selection circuit 40 does not pass to the ESD clamp 30. Rather, the pFET in the last inverter of the trigger circuit 20 is turned on, so that a "1" is at the gate of the ESD clamp 30, so that the ESD clamp turns on during the ESD event. As such, since an ESD event occurred, any additional electrostatic properties are clamped by the ESD clamp 30. However, since the ESD clamp 30 is not turned on until the ESD event occurs, the current leakage from the ESD clamp 30 is completely eliminated.

Turning now to FIG. 2, a schematic diagram of an electrostatic discharge protection device 2 according to embodiments of the invention is shown. It is understood that the ESD protection device 2 shown in FIG. 2 is substantially identical to the ESD protection device 1 shown in FIG. 2. However, the "A" input to the gate of nFET 42A of the nFET bias selection circuit 40 is no longer from the output of the RC circuit 10. Rather, the "A" input is connected to the output of the second inverter in the trigger circuit 20. It is understood that ESD protection device 2 operates similarly to ESD protection device 1, as shown in FIG. 1.

Turning now to FIG. 3, a schematic diagram of an integrated circuit (IC) 5 including an electrostatic discharge protection device 1, 2 according to embodiments of the invention is shown. The IC 5 shown in FIG. 3 includes a plurality of I/O devices 7. In between several of these I/O devices 7 may include an ESD protection device 1, 2, as shown in FIGS. 1-2. As discussed above, the negative bias voltage may be provided by the negative bias voltage supply 50 (e.g., an on-chip charge pump). However, each ESD protection device 1, 2 does not require a separate negative bias voltage supply 50 (e.g., an on-chip charge pump). Rather, as shown in FIG. 3, a single charge pump 50 may be provided to each ESD protection device 1, 2.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrostatic discharge (ESD) protection device for an integrated circuit (IC), comprising:
    a resistor-capacitor (RC) circuit for receiving a power supply voltage;
    an ESD clamp including a plurality of n-type field-effect transistors (nFETs) for protecting the IC during an ESD event;
    a trigger circuit for receiving an output of the RC circuit and generating a trigger pulse to turn on the ESD clamp during the ESD event; and
    an nFET bias selection circuit connected to the trigger circuit, the nFET bias selection circuit for selecting one of: a low voltage supply or a negative bias voltage supply to pass to the trigger circuit, such that the trigger circuit generates a trigger pulse to select the negative bias voltage supply and to turn off the ESD clamp during normal operation.

2. The ESD protection device of claim 1, wherein the trigger circuit includes a plurality of inverters.

3. The ESD protection device of claim 2, wherein each inverter includes an nFET and a p-type field-effect transistor (pFET).

4. The ESD protection device of claim 1, wherein the nFET bias selection circuit selects the low voltage supply during the ESD event.

5. The ESD protection device of claim 1, wherein the nFET bias selection circuit includes a pair of nFETs.

6. The ESD protection device of claim 5, wherein a source of one of the nFETs in the pair of nFETs is connected to the negative bias voltage supply.

7. The ESD protection device of claim 6, wherein the negative bias voltage supply comprises a charge pump.

8. The ESD protection device of claim 6, wherein the negative bias voltage supply comprises an external power supply.

9. An integrated circuit (IC) comprising:
    A plurality of electrostatic discharge (ESD) protection devices for the (IC), each ESD protection device comprising:
    a resistor-capacitor (RC) circuit for receiving a power supply voltage;
    an ESD clamp including a plurality of n-type field-effect transistors (nFETs) for protecting the IC during an ESD event;
    a trigger circuit for receiving an output of the RC circuit and generating a trigger pulse to turn on the ESD clamp during the ESD event; and
    an nFET bias selection circuit connected to the trigger circuit, the nFET bias selection circuit for selecting one of: a low voltage supply or a negative bias voltage supply to pass to the trigger circuit, such that the trigger circuit generates a trigger pulse to select the negative bias voltage supply and to turn off the ESD clamp during normal operation.

10. The IC of claim 9, wherein the trigger circuit includes a plurality of inverters.

11. The IC of claim 10, wherein each inverter includes an nFET and a p-type field-effect transistor (pFET).

12. The IC of claim 9, wherein the nFET bias selection circuit selects the low voltage supply during the ESD event.

13. The IC of claim 9, wherein the nFET bias selection circuit includes a pair of nFETs.

14. The ESD protection device of claim 5, wherein a source of one of the nFETs in the pair of nFETs is connected to the negative bias voltage supply.

15. The ESD protection device of claim 6, wherein the negative bias voltage supply comprises a charge pump.

16. The ESD protection device of claim 6, wherein the negative bias voltage supply comprises an external power supply.

17. A method of eliminating current leakage in an electrostatic discharge (ESD) protection device for an integrated circuit (IC), the method comprising:
    providing an ESD clamp for protecting the IC during an ESD event, the ESD clamp including a plurality of n-type field-effect transistors (nFETs) and directly connected to an RC circuit and a trigger circuit of the ESD protection device;

providing an nFET bias selection circuit connected to the trigger circuit, the nFET bias selection circuit for selecting a low voltage supply or a negative bias voltage supply;

turning off the ESD clamp, during normal operation, by controlling a gate of the ESD clamp by providing the negative bias voltage supply to the trigger circuit; and turning on the ESD clamp, during the ESD event, by controlling the gate of the ESD clamp by providing the low voltage supply to the trigger circuit.

18. The method of claim 17, wherein the negative bias voltage supply is one of following: an external supply or a charge pump.

\* \* \* \* \*